United States Patent
Park

[11] Patent Number: 5,944,934
[45] Date of Patent: Aug. 31, 1999

[54] MANUFACTURING METHOD OF LIQUID CRYSTAL DISPLAY PANEL AND APPARATUS THEREFOR

[75] Inventor: Kwan-sun Park, Seoul, Rep. of Korea

[73] Assignee: Samsung Electronics Co., Ltd., Suwon, Rep. of Korea

[21] Appl. No.: 08/604,489

[22] Filed: Feb. 21, 1996

[30] Foreign Application Priority Data

Feb. 27, 1995 [KR] Rep. of Korea ............... 95-3900

[51] Int. Cl.⁶ .................................. B29C 43/56
[52] U.S. Cl. ........................... 156/285; 141/8
[58] Field of Search .................. 156/285, 382, 156/109; 141/7, 8; 359/82; 445/24, 25

[56] References Cited

U.S. PATENT DOCUMENTS

| | | | |
|---|---|---|---|
| 4,685,771 | 8/1987 | West et al. | 350/347 V |
| 4,688,900 | 8/1987 | Doane et al. | 350/347 V |
| 5,269,351 | 12/1993 | Yoshihara | 141/7 |

FOREIGN PATENT DOCUMENTS

| | | |
|---|---|---|
| 534590 | 3/1993 | European Pat. Off. . |
| 691564 | 1/1996 | European Pat. Off. . |
| 3-64731 | 3/1991 | Japan . |

*Primary Examiner*—Francis J. Lorin
*Attorney, Agent, or Firm*—Burns, Doane, Swecker & Mathis, L.L.P.

[57] ABSTRACT

There is provided a manufacturing method of a liquid crystal display panel. The manufacturing method includes the steps of manufacturing a panel having a cell gap by joining a substrate including a pressure-reducing port and an injection port to another substrate having no pressure-reducing and injection ports, injecting a liquid crystal material containing a liquid crystal and a polymer monomer into the cell gap, and curing the polymer monomer included in the cell gap, wherein the step of injecting a liquid crystal material is performed by applying pressure to the liquid crystal material using a pressure-applying apparatus, after reducing the inside pressure of the cell gap. Thus, the manufacture of a liquid crystal display panel is easy, and the waste of the liquid crystal material is minimized. Further, the optical properties of the fabricated panel are at least as excellent as those of a panel made by a conventional vacuum injection method or a conventional compression method.

13 Claims, 1 Drawing Sheet

MANUFACTURING METHOD OF LIQUID CRYSTAL DISPLAY PANEL AND APPARATUS THEREFOR

BACKGROUND OF THE INVENTION

The present invention relates to a manufacturing method for a liquid crystal display panel and an apparatus therefor and, more particularly, to a manufacturing method of a liquid crystal display panel which can suppress the occurrence of bubbles during the injection of a liquid crystal material into a cell gap, and facilitate the control of cell thickness, and an apparatus therefor.

Liquid crystal displays (hereinafter, referred to as LCDs) have the advantages of a low leakage current level in liquid crystal itself, no need for high storage capacities, and small power dissipation. As a result, the demand for LCDs is increasing. Of the LCDs, a twisted nematic (TN) type LCD and a super twisted nematic (STN) type LCD are the more common ones.

However, a polarizing plate is required on each surface of a panel for a conventional TN type or STN type LCD, and such polarizing plates deteriorate light transmissivity, leading to a decrease in the luminance of the LCD. Especially when a color filter is used, a strong light source is necessary, since the intensity of transmitted light is less than 10% of that of incident light, thereby resulting in the an increase in dissipation.

As a way to overcome the problems, a polymer dispersed liquid crystal display (PDLCD) adopting a light scattering mode wherein a polymer is dispersed into a liquid crystal, has been recently developed. The PDLCD applies the principle that when an electric field is not applied, incident light scatters due to a disparity in the refractive index of the liquid crystal and the polymer, while when an electric field is applied, the liquid crystal is arranged in the direction of the electric field, and thus the incident light is transmitted. As is noted, relying on the principle of light scattering and transmission, the PDLCD does not use polarizing plates, consequently obtaining excellent luminance since its light utilization efficiency is higher than that of a conventional LCD.

Such a PDLCD is generally manufactured by a phase-separation method utilizing the difference in the solubility of a polymer and a liquid crystal (see U.S. Pat. Nos. 4,688,900 and 4,685,771). That is, the manufacture of a PDLCD is accomplished by utilizing the principle that liquid crystal droplets are formed by dissolving the liquid crystal in the monomers of a transparent polymer resin (hereinafter, referred to as monomers) and thereafter, polymerizing the monomers or oligomers of the polymer resin by ultraviolet irradiation or heating.

There are a vacuum injection method and a compression method for the injection of a liquid crystal into a cell gap in a manufacturing process of a LCD panel. The vacuum injection method is currently employed for a TN type or STN type LCD, both of which being the most widely used LCDs, for the reason that it simplifies the manufacturing process and facilitates the control of cell thickness after injecting a liquid crystal.

The vacuum injection method will be described in detail. The injection of liquid crystal is generally accomplished by reducing the inside pressure of a cell gap between two substrates and submerging an injection port (formed on one of the two substrates) into a container filled with liquid crystal.

However, the above vacuum injection method has a problem. That is, optical properties may be deteriorated due to the occurrence of bubbles in the cell gap when injecting the liquid crystal material.

Especially, in the case of a PDLCD utilizing the principle of light scattering and transmission, the existence of bubbles in a cell gap greatly decreases a contrast ratio. Moreover, when injecting a liquid crystal material under high vacuum state, a high-volatile monomer contained in the material is evaporated, thus leading to the change of a compounding ratio, being an essential factor to determine optical properties, of the liquid crystal and the monomer.

Therefore, a compression method is used for injecting a liquid crystal in the fabrication of a large PDLCD panel. The compression method is advantageous to the fabrication of a large display device, but it exhibits the disadvantages of difficulty with the control of cell thickness, which is an important factor to determine optical properties, and excessive consumption of liquid crystal, thereby increasing fabrication cost. In addition, for the purpose of sealing the edge, which is necessary after injecting the liquid crystal material in order to prevent the leakage of the liquid crystal material, a portion for binding should be cleaned to improve the adhesiveness of a substrate and an adhesive, thus making the manufacturing process complicated.

SUMMARY OF THE INVENTION

The object of the present invention is to provide a manufacturing method of a liquid crystal display panel having improved optical properties by suppressing the occurrence of bubbles when injecting a liquid crystal material into a cell gap, and facilitating the control of cell thickness.

To achieve the above object, there is provided a manufacturing method of a liquid crystal display panel, the manufacturing method comprising the steps of:

preparing a panel having a cell gap by joining a substrate including a pressure-reducing port and an injection port to another substrate having no pressure-reducing and injection ports;

injecting a liquid crystal material containing a liquid crystal and a monomer of the transparent polymer into the cell gap; and curing the monomer, wherein the step of injecting a liquid crystal material is performed by applying pressure to the liquid crystal material using pressure-applying means, while reducing the inside pressure of the cell gap to $10^{-3}$ torr or below.

Another object of the present invention is to provide a liquid crystal material injection apparatus which can alleviate the occurrence of bubbles and minimize consumption of liquid crystal by injecting a liquid crystal material into a cell gap under an appropriate pressure.

Another object of the present invention can be achieved by providing a liquid crystal material injection apparatus comprising:

a container for containing a liquid crystal material;

an injection member formed on one end of the container, for injecting the liquid crystal material through an injection port of a substrate;

a valve member formed on one portion of the injection member, for controlling the injection of the liquid crystal material; and a pressure-applying member for applying pressure to the liquid crystal material in the container.

The present invention suppresses the occurrence of bubbles by injecting a liquid crystal material while the inside pressure of the cell is reduced to a predetermined level, and the liquid crystal material is directly injected by the liquid crystal material injection apparatus having a container for containing the liquid crystal material.

BRIEF DESCRIPTION OF THE DRAWINGS

The above objects and advantages of the present invention will become more apparent by describing in detail a preferred embodiment thereof with reference to the attached drawings in which.

DETAILED DESCRIPTION OF THE INVENTION

The present invention will be described in detail, referring to the attached drawings.

Manufacture of a Panel Having a Cell Gap

Figure 1:
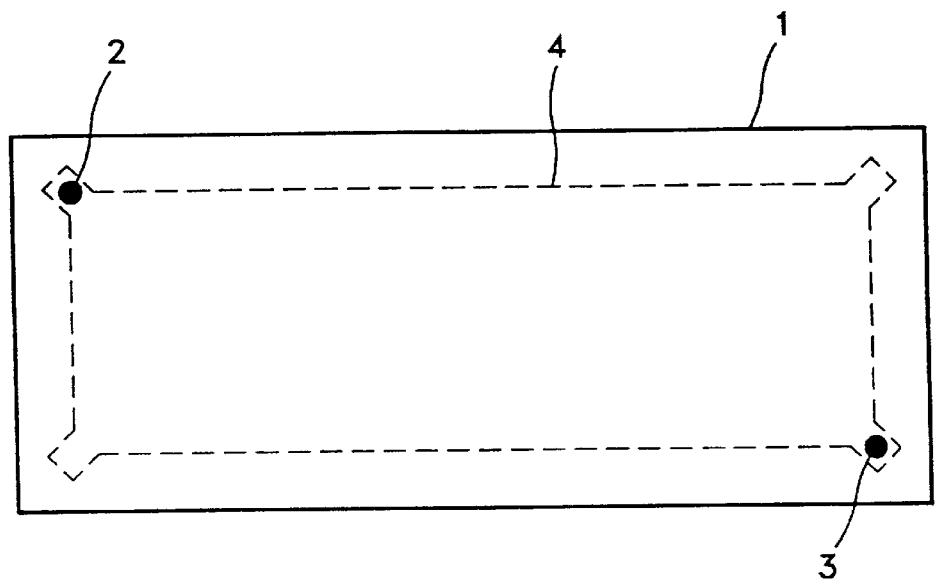
FIG. 1 illustrates a substrate having a pressure-reducing port and an injection port formed thereon.

Referring to FIG. 1, an injection port 2 and a pressure-reducing port 3 are formed on one substrate 1. Spacers for controlling cell thickness are distributed onto the other substrate (not shown) in order to form a cell gap having a predetermined thickness. The spacer distribution is generally accomplished by using a distributing apparatus. Alternatively, it may be accomplished by forming projections in manufacturing a substrate for a liquid crystal display device.

Subsequently, the area between the edge of substrate having the spacers distributed thereon and a sealing line 4 is screen-printed with an ultraviolet-curing sealant. Thereafter, while substrate 1 is overlaid on the other substrate having the spacers and pressure is applied to the substrates, the sealant is cured. Thus, a panel having a cell gap is fabricated.

Method of Injecting a Liquid Crystal Material into a Cell Gap

Figure 2:
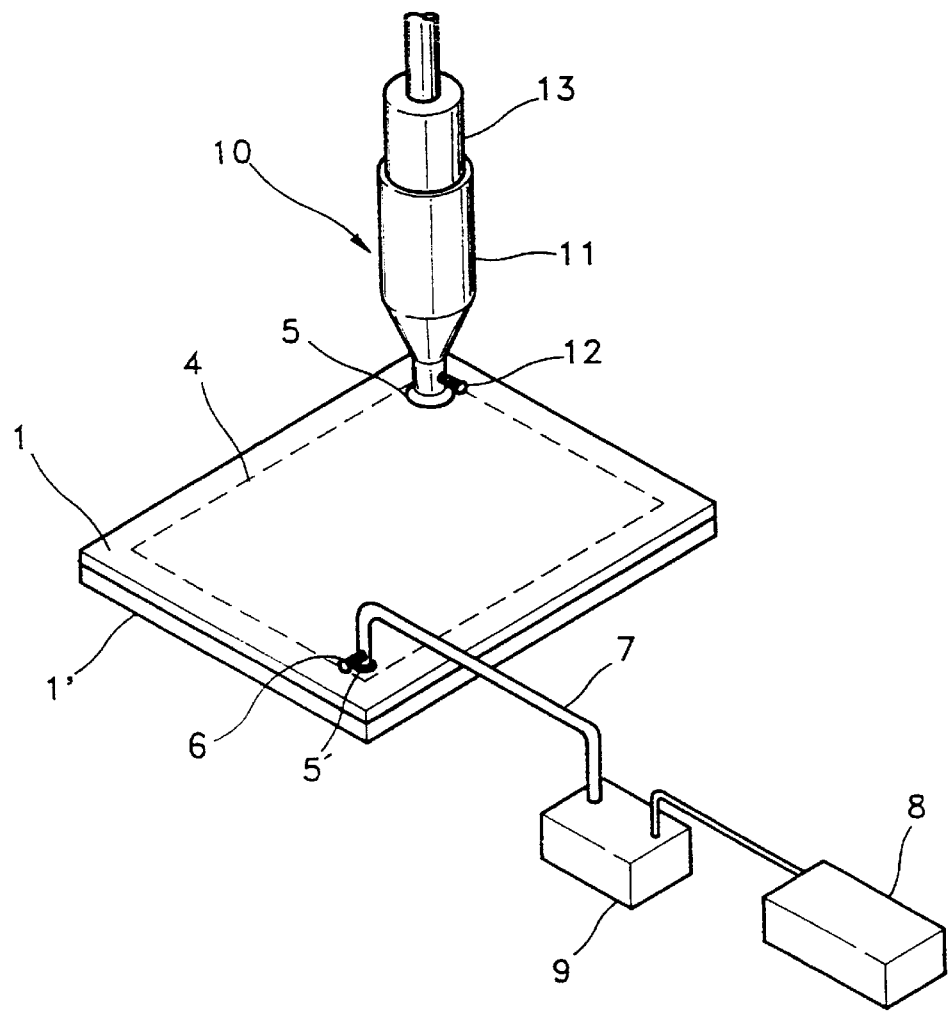
FIG. 2 illustrates a liquid crystal material injecting method according to an embodiment of the present invention.

FIG. 2 illustrates a liquid crystal material injecting method according to an embodiment of the present invention. Referring to FIG. 2, the cell gap formed between two substrates 1 and 1' is pressure-reduced to a high vacuum state by means of a pressure-reducing pump 8 which is connected to a pressure-reducing port (not shown) by a hose 7, while an injection controlling valve 12 connected to an injection apparatus 10 having an injector-type container 11, 13 for containing the liquid crystal material and a pressure-applying member 13, is closed. If the pressure inside the cell gap is reduced to a predetermined level or below, the liquid crystal material is made to infiltrate into the cell gap through the injection port (not shown) by operating a pressure-applying apparatus (not shown) with the injection controlling valve 12 opened. The pressure when injecting the liquid crystal material is constantly controlled by controlling a pressure-reducing control valve 6, and can vary with the volatility and temperature of the liquid crystal material. Nevertheless, the pressure is preferably $10^{-3}$ torr or below.

The use of the injection apparatus described above exhibits the advantages that the pollution of a liquid crystal material in the process of injecting the liquid crystal material can be prevented and the amount of liquid crystal material wasted, i.e., not used, can be minimized. That is, since an injection process is performed while an injection port is submerged in the liquid crystal material of a container instead of using an injection apparatus, in a conventional method, the liquid crystal material is polluted or the rest of the material after the injection is wasted. However, these problems are solved in the present invention.

The size and shape of injection port 2 may be readily designed according to the size and thickness of the liquid crystal cell. It is desired to decrease the viscosity of the liquid crystal by maintaining the temperature of the cell higher than a normal temperature, in order to reduce an injection resistivity. Especially, it is efficient for the prevention of the phase-separation of the constituents of the liquid crystal material caused in an injection, to perform the injection operation at the isotropic phase transition temperature where the liquid crystal is dissolved in the monomer. When the liquid crystal is infiltrated into the cell, the level of vacuum in the cell is decreased. To overcome this problem, it is desirable to continuously maintain the depressurized state through pressure-reducing port 3.

As shown in FIG. 2, there are provided connection members 5 and 5' for sealing between pressure-applying injection apparatus 10 and the injection port, and between pressure-reducing hose 7 and the pressure-reducing port. The connection members 5 and 5' are preferably made of a silicon rubber and the like showing a good adhesiveness with glass.

In the present invention, the liquid crystal material in the cell gap is made to have a uniform compounding ratio by pressing out some of the liquid crystal material injected earlier, using a liquid crystal material removing trap 9. Namely, the original compounding ratio of the liquid crystal material injected earlier is changed due to the evaporation of a highly volatile monomer when injecting the liquid crystal material. Therefore, the liquid crystal material having a changed compounding ratio is removed by using a liquid crystal material removing trap 9. Therefore, according to the present invention, any liquid crystal material can be used even if it is highly volatile.

Control of Cell Thickness After Injecting a Liquid Crystal Material

When the above process is finished, the pressure is continuously reduced using pressure-reducing pump 8 while injection port 2 is sealed by closing injection controlling valve 12 of injection apparatus 10, and thereafter pressure-reduction controlling valve 6 is closed. This process, being a simple way to make the cell thickness highly uniform, can produce the same effect as the control of the cell thickness by applying pressure using a metal plate having a high flatness so as to control the cell thickness in a conventional vacuum injection.

The present invention will be in more detail referring to the following examples, but the present invention is not limited to the following examples.

EXAMPLE

There was prepared a substrate of 15 cm×20 cm having indium tin oxide (ITO) transparent electrodes formed thereon. Spacers having an average size of 12 $\mu$m were dispersed in methanol and the substrate was coated with the resultant. Thereafter, the methanol was evaporated and the spacers became fixed. An ultraviolet-curing resin was seal-printed on the brim of the substrate and another substrate was overlaid on the substrate. Then, the resin was cured while both the substrates were compressed. Thus, a panel having a cell gap was manufactured. Subsequently, a pressure-reducing hose having a pressure-reduction controlling valve and a liquid crystal material removing trap provided thereto was connected to a pressure-reducing port, and an injection hole was connected to a pressure-applying injection apparatus having an injection control valve attached thereto.

A liquid crystal material obtained by mixing an ultraviolet-curing monomer containing a polymerization initiator (PN393, Merck & co., inc.) and a liquid crystal (TL203) at a weight ratio of 20 to 80 in another container, was put into the liquid crystal injection apparatus with the injection controlling valve closed. The liquid crystal material was subsequently injected by applying pressure with the injection control valve opened, under a high vacuum state made by reducing the pressure of the cell gap through the pressure-reducing port. After the injection of the liquid crystal material was completed, the cell thickness was made uniform by operating the pressure-reducing pump for more 3 minutes with the injection port closed. No bubbles were observed in the cell.

Finally, a liquid crystal display panel was fabricated by curing the monomer by irradiating ultraviolet rays to the cell. The fabricated panel exhibited excellent optical properties with a contrast ratio of 300 to 1, and a maximum light transmissivity of 80% or above.

Comparative Example 1

A liquid crystal display panel was manufactured by the same method as that of the embodiment, except that a pressure-applying injection apparatus of the present invention was not used when injecting a liquid crystal material. That is, the liquid crystal material was injected into a cell gap by making the cell gap in a state of vacuum through a pressure-reducing port while an injection port is put into a container having the liquid crystal material. Bubbles were found in the cell gap into which the liquid crystal had been injected.

Finally, as in the example, the liquid crystal display panel was fabricated by curing a monomer, irradiating ultraviolet rays to the cell. The fabricated panel exhibited poor optical properties with a contrast ratio of 50 to 1 and a maximum light transmissivity of 80%. The reason for this is that bubbles were formed in the cell when injecting the liquid crystal material.

Comparative Example 2

A substrate of 15 cm×20 cm having transparent ITO electrodes formed thereon was prepared. Spacers having an average size of 12 $\mu$m were dispersed into methanol, and the substrate is coated with the resultant. Thereafter, the methanol is evaporated and thus the spacers were fixed.

A liquid crystal material obtained by mixing an ultra-curing monomer containing a polymerization initiator (PN393, Mercker & co., inc.) and a liquid crystal (TL203) at a weight ratio of 20 to 80, was prepared. The liquid crystal material was coated on the substrate where the spacers were distributed, and the substrate was joined to another substrate. Thus, a liquid crystal display panel was fabricated.

The fabricated panel exhibited similar optical properties to those of the panel fabricated in the example, with a contrast of 300:1 and a maximum light transmissivity of 80%.

As described above, according to the present invention, the manufacture of a liquid crystal display panel is easy, the waste of the liquid crystal material is minimized, and the optical properties of the fabricated panel are as excellent as those of a panel made by a compression method requiring a more complicated processes.

The above examples are illustrative, and not limitative, of the present invention, the scope of which is to be determined by the claims appended hereto.

What is claimed is:

1. A manufacturing method of a liquid crystal display panel comprising the sequential steps of:
   preparing a panel having a cell gap between two substrates which includes a pressure-reducing port and an injection port;
   reducing the inside pressure of said cell;
   injecting a liquid crystal material containing liquid crystal and monomers of a transparent polymer resin into said cell gap by applying pressure to said liquid crystal material, while maintaining the reduced pressure of said cell at a constant; and
   curing said monomer of the transparent polymer resin.

2. A manufacturing method of a liquid crystal display panel as claimed in claim 1, wherein the reduction of the inside pressure is performed using pressure-reducing means connected to said pressure-reducing port.

3. A manufacturing method of a liquid crystal display panel as claimed in claim 1, wherein, in said injecting step, the pressure-applying is performed using pressure-applying means.

4. A manufacturing method of a liquid crystal display panel as claimed in claim 1, wherein the temperature of said cell in said injecting step is higher than the isotropic temperature of the liquid crystal injected.

5. A manufacturing method of a liquid crystal display panel as claimed in claim 1, wherein the temperature of said cell in said applying step is higher than the isotropic temperature of the liquid crystal injected.

6. A manufacturing method of a liquid crystal display panel as claimed in claim 1, further comprising the step of pressing out, by reducing pressure after the injection of said liquid crystal is completed, and removing a portion of said liquid crystal material through said pressure-reducing port.

7. A manufacturing method of a liquid crystal display panel as claimed in claim 6, wherein said removed liquid crystal material is collected in a removing trap.

8. A manufacturing method of a liquid crystal display panel as claimed in claim 1, further comprising the step of operating said pressure-reducing means with said pressure-applying means closed, after the injection of said liquid crystal material is completed.

9. A manufacturing method of a liquid crystal display panel as claimed in claim 8, wherein said pressure-reducing means is a reducing pump.

10. A liquid crystal material injection apparatus for injecting a liquid crystal material into a cell gap between two substrates one of which has a pressure-reducing port and an injection port, comprising:
    pressure-applying means comprising;
       a container for containing a liquid crystal material;
       an injection member formed on one end of said container, for injecting said liquid crystal material through said injection port of a substrate;
       a valve member formed on one portion of said injection member, for controlling the injection of said liquid crystal material; and
       a pressure-applying member for applying pressure to said liquid crystal material in said container; and
    pressure-reducing means including a pressure-reducing control valve for reducing the pressure of said cell through said pressure-reducing port to maintain the reduced pressure of said cell at a constant.

11. A liquid crystal material injection apparatus as claimed in claim 10, further comprising a removing trap between said pressure reducing port and said pressure reducing means for collecting a liquid crystal material removed through said pressure-reducing port.

12. A liquid crystal material injection apparatus as claimed in claim 10, wherein said pressure-reducing means is a reducing pump.

13. A liquid crystal material injection apparatus as claimed in claim 10, further comprising connection members for sealingly connecting said pressure-applying means and said injection port, and between said pressure-reducing means and said pressure-reducing port.

* * * * *